United States Patent [19]

Chatelain

[11] Patent Number: 4,665,330
[45] Date of Patent: * May 12, 1987

[54] STEP MOTOR PARTICULARLY FOR ELECTRONIC TIMEPIECES

[75] Inventor: Jean-Claude Chatelain, Beure, France

[73] Assignee: Centre Technique de l'Industrie Horlogere "Cetehor", France

[*] Notice: The portion of the term of this patent subsequent to May 21, 2002 has been disclaimed.

[21] Appl. No.: 711,094

[22] Filed: Mar. 13, 1985

Related U.S. Application Data

[63] Continuation-in-part of Ser. No. 572,432, Jan. 25, 1984, Pat. No. 4,518,884, which is a continuation of Ser. No. 255,220, Apr. 17, 1981, abandoned.

[30] Foreign Application Priority Data

Apr. 18, 1980 [FR] France .................. 80 08807

[51] Int. Cl.⁴ ............................................. H02K 37/00
[52] U.S. Cl. ....................................................... 310/49 R
[58] Field of Search .......................... 310/49, 162-165

[56] References Cited

U.S. PATENT DOCUMENTS

| | | | |
|---|---|---|---|
| 3,969,642 | 7/1976 | Yoshino | 310/49 |
| 3,979,616 | 9/1976 | Stechman | 310/49 |
| 4,205,244 | 5/1980 | Fukushima | 310/49 |
| 4,324,992 | 4/1982 | Paratte | 310/49 |
| 4,329,601 | 5/1982 | Mai | 310/49 |
| 4,518,884 | 5/1985 | Chatelain | 310/49 |

*Primary Examiner*—Donovan F. Duggan

[57] ABSTRACT

The invention relates to a step motor particularly for an electronic timepiece, comprising a stator whose two free ends constitute two pole pieces delimiting therebetween an air-gap in which is accommodated the rotor. Each pole piece is provided with a recess of cylindrical shape so that the axis of each cylinder is parallel with the axis of rotation Ar of the rotor. The two axes of the said cylinders are shifted from one another by a value comprised between $80\mu$ and $200\mu$ in a direction perpendicular to the plane defined by the axis of rotation Ar of the rotor and the main direction of the flux generated by an exciting coil associated with the stator. The radii of the rotor and the stator are in the order of about $800\mu$ and $1500\mu$ respectively.

8 Claims, 10 Drawing Figures

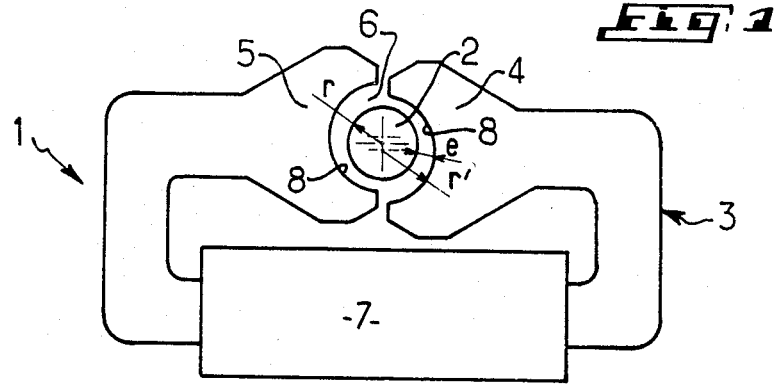
Fig. 1
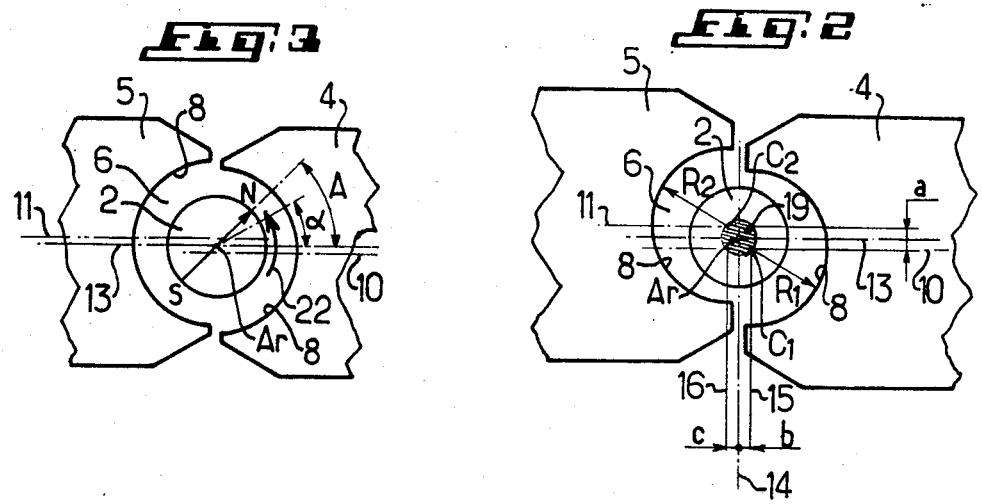
Fig. 3
Fig. 2
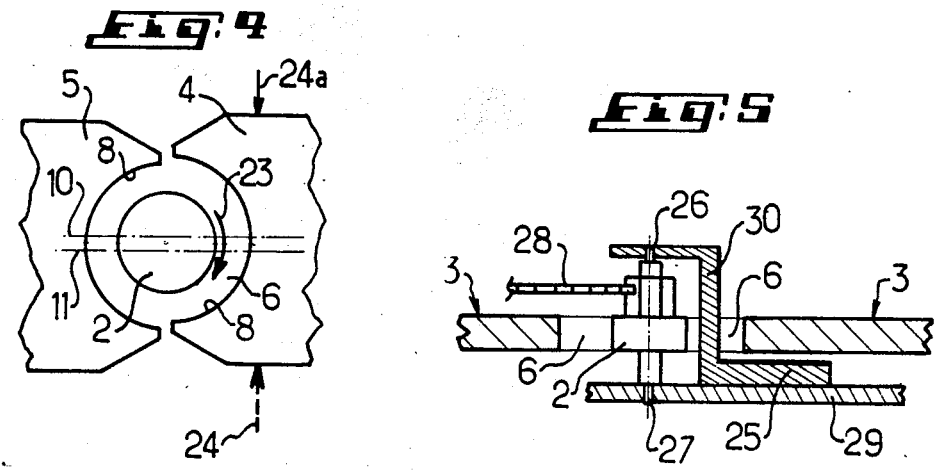
Fig. 4
Fig. 5

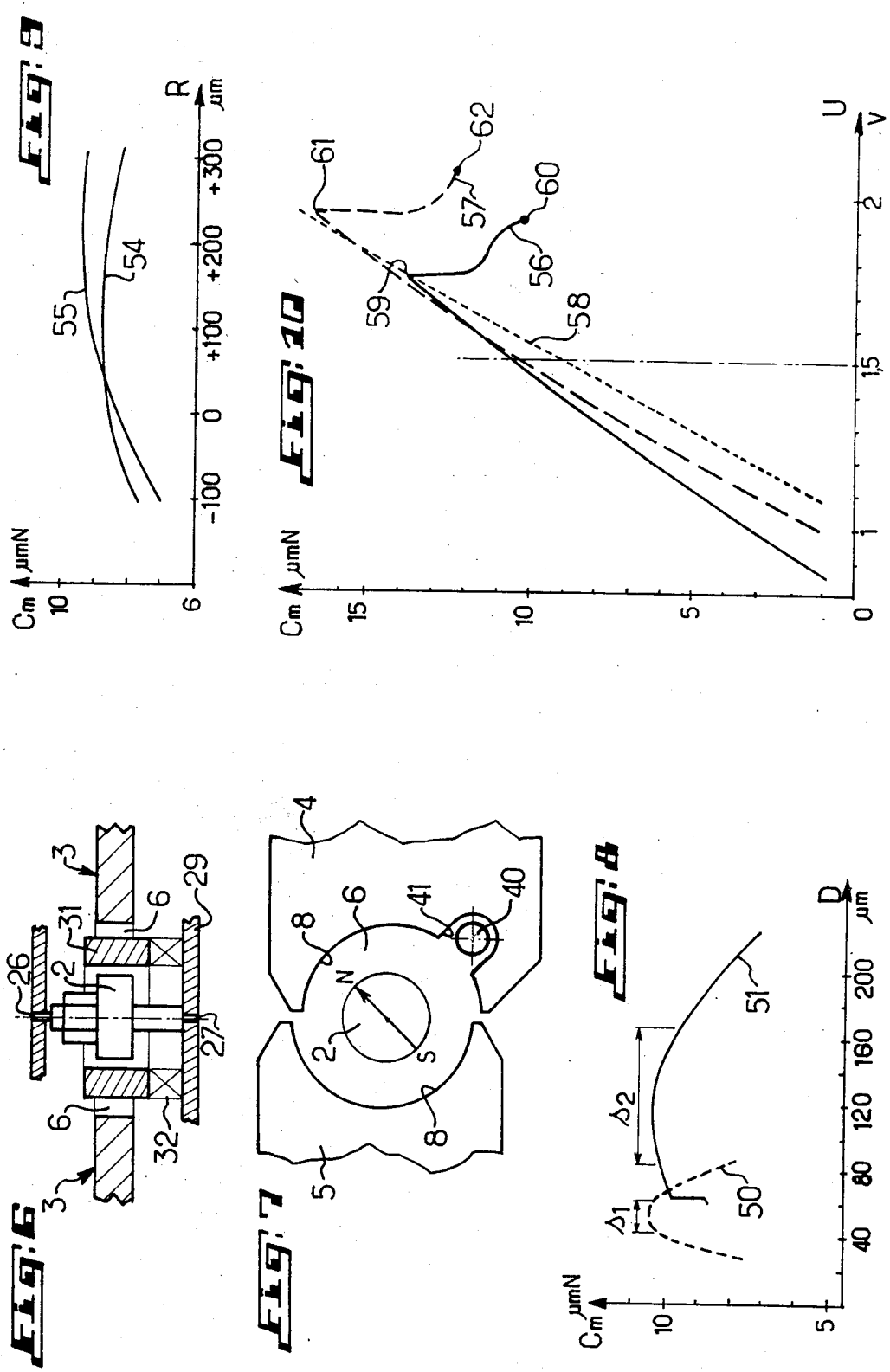

STEP MOTOR PARTICULARLY FOR ELECTRONIC TIMEPIECES

BACKGROUND OF THE INVENTION

The present application is a continuation-in-part of co-pending appln. Ser. No. 572,432, filed Jan. 20, 1984, now U.S. Pat. No. 4,518,884 issued May 21, 1985, which is in turn a continuation of co-pending appln. Ser. No. 255,220 filed Apr. 17, 1981 and now abandoned.

The present invention relates generally to a step motor and has more particularly for a subject matter a step motor usable in the timepiece making industry to drive in particular the hands of timepieces such as clocks or watches.

The use is known of step motors in the timepiece making industry to drive the whole of the moving equipment of timepieces. Such motors are usually constituted by a permanently magnetized rotor provided with at least two poles, by a stator of a material with high magnetic permeability, whose two free ends bent towards one another constitute two pole pieces, respectively, delimiting therebetween an air-gap in which the rotor rotates, and by a coil associated with the stator.

However, the major problem encountered is the accuracy of the relative position of the two stator pole pieces, which is very difficult to obtain. This results in very tight manufacturing tolerances or excessively fine adjustments which are very difficult to perform.

SUMMARY OF THE INVENTION

The present invention allows the said tolerances to be considerably improved by using a specific form of stator depending on the magnet used for the rotor, on the coil and on the motor characteristics which it is desired to achieve.

To this end, the invention provides a step motor the free end of each pole piece of which is provided with a recess substantially cylindrical in shape in such a way that the axis of each cylinder is parallel to the axis of rotation of the rotor, characterized in that the two axes of the two cylinders are shifted with respect to one another by a value comprised between $80\mu$ and $200\mu$, in a direction perpendicular to the plane (P) defined by the axis of rotation of the rotor and the main direction of the magnetic flux generated by the coil and circulating in the air-gap, the radii of the rotor and the stator being in the order of about $800\mu$ and $1500\mu$ respectively.

According to another characterizing feature of the invention, the axes of the two recesses, usually in a plane perpendicular to the aforesaid plane (P), may be spaced from one another by a value or recoil comprised between $150\mu$ and $300\mu$.

According to another characterizing feature of the invention, the axis of rotation of the rotor may be positioned at any point of an area perpendicular to the said axis, delimited by a circle with a radius value of $200\mu$ whose center is located at the middle of the segment joining together the two axes of the two recesses in a plane perpendicular to the said two axes.

According to another characterizing feature of the invention, the ratio of the mean air-gap to the rotor magnet radius has a value comprised between 0.7 and 1.

According to another characterizing feature of the invention, it is possible to displace in one direction or the other a pole piece with respect to the other pole piece in a plane perpendicular to the axis of rotation of the rotor, resulting in a reversal of the direction of rotation.

According to another characterizing feature of the invention, at least one ferro-magnetic member of the motor or of the timepiece may be accomodated in the air-gap, in particular, a gear-train arbor of ferro-magnetic material; e.g. of steel, may extend through at least one deep groove, provided in at least one recess in a pole piece without modifying the operation of the motor, the said train arbor taking no part in the electromagnetic operation of the motor.

Such a motor applied to an electronic timepiece offers many advantages such as particularly:

- a substantially constant torque on occurence of a relatively important variation in the shift between the two axes of the pole piece recesses, which was not obtained in the prior art;
- also very large manufacturing tolerances are obtained for the recoil;
- all the parameters involved in the air-gap region are less critical with a relatively large air-gap, especially the magnet diameter, the magnet thickness, the magnet BH max, the out of roundness or out of flatness of the magnet on its axis, the position of the rotor bearings with respect to the stator, the accuracy of the position of the pole pieces, the finish of the pole surfaces, the end of the pole pieces which are less influential as to their accuracy and their symmetry, the self-inductance of the stator coil less influenced in its variations during manufacture since the reluctance of the magnetic circuit or of the coil is less disturbed by the dimensional discrepancies of the internal shapes of the stators, the air-gap being relatively large;
- ferro-magnetic members such as for example a train arbor may be accomodated in the air-gap so as to obtain a maximum reduction of the distance between centers of the first gear;
- torque discontinuities are far removed from the point of operation of the motor (voltage about 1.5 volts, pulse width 7.7 milliseconds) by using a large shift and a large recoil;
- with a recoil much greater than $250\mu$, the rotor may have two modes of operation. With pulses of about 7.8 milliseconds, the rotor rotates in a normal direction and has but one preferential direction, with shorter pulses, it may rotate in both directions to allow reverse-motion electronic hand-setting;
- this result can also be achieved by displacing the stator pole pieces with respect to one another by means of a push-piece located on the case of the watch or the alarm.

BRIEF DESCRIPTION OF THE DRAWINGS

Other advantages and characterizing features of the invention will appear more clearly from the following detailed description with reference to the appended drawings given solely by way of example and the scale of the shift and recoil values of which are intentionally enlarged for a better understanding, and wherein:

FIG. 1 is a top and front view of a step motor according to the invention;

FIG. 2 is a partial and enlarged top view of the motor shown in FIG. 1 defining the shifts of the recess axes of the pole pieces;

FIG. 3 is a partial and enlarged top view of the motor represented in FIG. 1, and showing the shift of the recess axes of the pole pieces in normal position;

FIG. 4 is a partial and enlarged top view of the motor represented in FIG. 1 and showing a different shift from the one represented in FIG. 3;

FIGS. 5 and 6 are partial sectional views along a plane passing through the axis of rotation of the rotor, illustrating the various possible arrangements of the timepiece members in the air-gap according to the invention;

FIG. 7 is a partial and enlarged top view of the motor represented in FIG. 1 showing the passage of an arbor in the air-gap;

FIG. 8 is a diagram representing the variation of the torque $C_m$ as a function of the shift D of the recess axes of the pole pieces;

FIG. 9 is a diagram representing the variation of the torque $C_m$ as a function of the recoil R of the pole piece recess axes; and FIG. 10 is a diagram representing the torque $C_m$ as a function of the voltage U.

DESCRIPTION OF THE PREFERRED EMBODIMENTS

According to one example of embodiment illustrated in FIG. 1, a motor 1 according to the invention comprises essentially a permanently magnetized rotor 2 of a material whose permeability is about the same as that of air, such as samarium-cobalt, ferrite, platinum-cobalt or the like, and having at least two poles, a stator 3 of a material with high magnetic permeability whose two free ends bent towards one another constitute the pole pieces 4 and 5, respectively, delimiting therebetween an air-gap 6 in which is accommodated the motor rotor 2, a coil 7 associated with the stator 3 and receiving electric pulses from an electronic circuit (not shown).

The end surface of each pole piece is provided with a recess 8. To simplify the description, it will be assumed that the shape of the recess 8 is cylindrical with a radius r'.

As appears more clearly from FIG. 2, the two pole pieces 4 and 5 are shifted with respect to one another. More generally, without departing from the scope of the invention, the recess 8 of the pole piece 4 will be taken as a portion of a circle with a radius $R_1$ and a center $C_1$, and the recess 8 of the pole piece 5 as a portion of a circle with a radius $R_2$ and a center $C_2$. The values of the radii $R_1$ and $R_2$ may be either different or substantially equal.

As seen in FIG. 2, the axis 10 of the recess of the pole piece 4 is shifted by a value represented by a with respect to the axis 11 of the recess of the pole piece 5, in a plane perpendicular to the axis of rotation of the rotor 2 represented by the center $A_r$. The value of the shift of both pole pieces may be between $80\mu$ and $400\mu$ with the radii of the rotor 2 and the stator 3 being for instance in the order of about 0.8 mm or $800\mu$ and 1.5 mm or $1500\mu$ respectively. The value of the average width of the air-gap 6 is for instance in the order of about 0.7 mm or 700 microns.

It should be noted that if the shift were effected on only one of the two pole pieces, e.g. the pole piece 4 whose center $C_1$ of the recess 8 would be centered on the axis 13 of the rotor 2, the axis 13 representing the aforesaid plane (P), the pole piece 5 would be offset by the value a with respect to the axis 13, the result obtained is comparable to an obsolute symmetrical system and centered on the axis 13 of the rotor 2 according to the diagram shown in FIG. 2, for it is the relative position of the two pole pieces 4 and 5 of the stator 3 between themselves that is important and not their position with respect to the axis 13 of the rotor 2.

On the other hand, this shift will be greater as the diameters of the recesses and of the rotor magnet are greater, as the ratio of the mean air-gap to the diameter of the rotor magnet is greater, as the desired torque is greater, as the BH max of the magnet is lower, as the flux of the coil is greater, as the efficiency of the motor is lower, and as the electric energy consumption per step of the motor is greater.

In FIG. 2, the recesses 8 of the pole pieces 4 and 5 are represented by portions of circles with a center $C_1$ and a radius $R_1$ and with a center $C_2$ and a radius $R_2$, respectively, this being shown in a plane perpendicular to the axis of rotation $A_r$ of the rotor 2. The centers $C_1$ and $C_2$ normally located on the axis 14 representing the plane perpendicular to the plane (P) defined by the axis of rotation $A_r$ of the rotor 2 and the main direction of the flux 13 generated by the coil 7 circulating in the air-gap 6, by a space b and c, the value of each space being between $80\mu$ and $150\mu$. This spacing is also called a recoil (R=b=c).

It should also be noted that it is the respective position of the two pole pieces 4 and 5 of the stator 3 that influences the characteristics of the motor 1. Thus, FIG. 2 shows a symmetrical recoil of each pole piece 4 and 5 with respect to the axis 14, but this recoil may be effected in respect of only one pole piece, e.g. 4, the other pole piece 5 being not recoiled with respect to the plane passing through the axis 14 of the rotor 2 and perpendicular to the axis 11. In other words, the center $C_1$ of the circle of the recess 8 of the pole piece 4 may be spaced with respect to the plane passing through the axis of rotation $A_r$ of the rotor 2 and perpendicular to the axis 10 of the pole piece 4 by the sum of the two spaces b and c, in the direction of the axis 10 of the pole piece 4; the center $C_2$ of the circle of the recess 8 of the pole piece 5 remaining centered on the axis 14 representing the plane passing through the axis of rotation $A_r$ of the rotor 2 and perpendicular to the main direction of the flux generated by the coil 7 and circulating in the air-gap 6.

In FIG. 2 the area 19 is also indicated in which the axis of rotation $A_r$ of the rotor 2 may be positioned. The area 19 is delimited by a circle with a radius value of 200 microns and with a center located at the middle of the segment $C_1$-$C_2$, in the plane of FIG. 2, i.e. in a plane perpendicular to the axis of rotation $A_r$ of the rotor 2. FIGS. 3 and 4 illustrate the reversal of the direction of rotation of the rotor 2, by reversing the shift of the axes 10 and 11. When axis 11 of the pole piece 5 is positioned above the axis 10 of the pole piece 4, the direction of rotation 23 of the rotor 2 is counter-clockwise. When the axis 11 of the pole piece 5 is located below the axis 10 of the pole piece 4, the direction of rotation 23 of the rotor 2 is clockwise (FIG. 4). This shift may advantageously be performed by means of push-pieces shown diagrammatically at 24 and 24a on the case of a watch, alarm or the like. This allows a hand-setting to be effected.

On the other hand, FIG. 3 shows the angle A representing the phase of the indexing couple with respect to the axis 13, the indexing couple being due to the variation in the reluctance of the magnetic circuit of the rotor magnet 2, the coil 7 being not supplied with current. There is also represented the angular value α varying from 0° to 360° indicating the position of the rotor 2, during its rotation.

On the other hand, in view of the relatively important shift values of the recess axes of the pole pieces, of the recoil and of the air-gap, it becomes possible to accommodate in the space of the air-gap, one or several members, as will be described hereafter.

In FIG. 5 is shown a lantern or like support 25 serving to position at least one bearing 26 of the rotor 2, the other bearing 27 being supported by a support plate 29 on which is also secured the lantern 25. The lantern 25 comprises a vertical central portion 30 passing through the air-gap 6 between the stator 3 and the rotor 2. The reference numeral 28 denotes a train associated with the rotor 2.

In FIG. 6 is shown an eddy-current brake constituted by a massive ring 31, either entirely circular or not, to better damp the movements of the rotor 2 at the end of each step. The massive ring 31 of a highly conductive material, e.g. of copper, is accommodated in the air-gap 6 between the rotor 2 and the stator 3. The said ring takes its bearing on a support plate 29 through the medium of chocks 32.

In FIG. 7 is represented the passage of a train arbor 40 between the rotor 2 and the stator 3. The train arbor 40 extends through the pole piece 4 within a groove 41 opening into the air-gap, without however disturbing the operation of the motor 1.

It has been found that the presence of the arbor 40 of ferro-magnetic material within the groove 41 does not affect the torque, if the groove is located at an angle of substantially 90° with respect to the line NS of the poles of the magnet in the rotor in the position shown on FIG. 7, if the arbor is set back in the groove with respect to the air-gap such as shown in FIG. 7 and if the presence of the arbor 40 is taken into account by appropriately shifting the pole-pieces so as to obtain substantially the same motor torque in the rest position of the rotor as in the case of absence of the arbor. This means that the presence of the arbor may be compensated by appropriately shifting the pole pieces. In its rest position, the rotor is not disturbed by the groove due to the important width of the air-gap in the groove region and to the fact that the pole of the rotor is angularly far away from the groove. It is further to be noted that the pole surface of the magnet is much greater than the surface of the groove, so that the latter does not affect the good working of the motor.

It should be noted that the train arbor or any other member may be of a ferro-magnetic material and may be completely independent of the electromagnetic operation of the motor. The position of the train arbor allows maximum reduction of the distance between centers of the first gear, thus reducing the dimensions of the timepiece.

FIGS. 8 and 9 represent the torque $C_m$ as a function of the shift D of the axes 10 and 11 of the recesses of the pole pieces 4 and 5, and the torque $C_m$ as a function of the recoil R, respectively. This torque is measured on the seconds-hand.

As seen in FIG. 8, where the curves are drawn for a given recoil, at a given voltage and a given electrical pulse width, the segment $s_1$ of the curve 50 represents the usable region for a motor in the present state of the art, the segment $s_2$ on the curve 51 represents the segment usable for a motor according to the invention.

Thus in spite of shift values carrying within the segment $s_2$ the motor torque $C_m$ remains substantially constant.

FIG. 9 shows the curve 55 for a minimal shift of the axes 10 and 11 of the recesses of the pole pieces 4 and 5, and the curve 54 shows a maximum shift of the axes 10 and 11 of the recesses of the pole pieces 4 and 5.

FIG. 10 represents the torque $C_m$ as a function of the voltage U for different values of the shift D. The curve 56 is drawn with a shift of 80μ, the curve 57 is drawn with a shift of 120μ, the curve 58 is drawn with a shift of 160μ.

On the curve 56, the reference numeral 59 denotes the discontinuity in the torque $C_m$ as a function of voltage U and the reference numeral 60 represents the voltage beyond which the motor no longer operates.

Likewise, the reference numeral 61 on the curve 57 represents the discontinuity in the torque $C_m$ as a function of voltage U and the reference numeral 62 represents the voltage beyond which the motor no longer operates.

It will be noted that the more important the shift, the farther the points of discontinuity from the point of operation (1.5 volts). The same holds true in respect of the curves representing the torque as a function of the pulse width.

The operation of the motor is as follows: when alternating electric pulses are applied to the terminals of the coil 7, south poles and north poles are caused to appear alternately in the pole pieces 4 and 5 of the stator 3, which repel the south and north poles of the rotor 2 alternately according to the polarity of the pulses. As a result, the rotor 2 accomplishes rotations of 180° at each pulse. The operation of a motor being known per se, it is not necessary to describe its operation in more detail.

One of the additional consequences of the invention lies in the fact that, in view of the relatively large airgap and of the possibility of positioning the axis of rotation of the rotor at any point of the area 19, if the magnet is offset with respect to the axis of rotation so as to produce a great out of roundness on the rotor, and if the axis of rotation is displaced in a direction close to the angle A of the afore-mentioned indexing phase, and by a value close to or greater than the out of roundness of the rotor, a motor according to the invention may be contemplated which will accomplish one step per turn (instead of two) provided it is supplied with unipolar pulses instead of alternating pulses as previously.

It will be noted that the torque practically does not vary as a function of the variation of the shift of the axes 10 and 11 of the recesses of the pole pieces 4 and 5 as shown in FIG. 8, thus allowing a quite considerable tolerance to be obtained as regards the unavoidable deviations in the positioning of the pole pieces 4 and 5 during manufacture. The said tolerances are of the order of ±10.

This is accounted for in the following manner, according to FIG. 3, the angle A represents the phase of the indexing couple with respect to the axis 13. The indexing couple is due to the variation in the reluctance of the magnetic circuit of the magnet of rotor 2, the coil 7 being not fed with current.

The axis 13 represents the axis of the flux due to the ampere turns of the coil 7.

The angle A is comprised between 0° and 90°,
in the proximity of 0°: the motor does not operate,
in the proximity of 90°: the motor is capable of rotating in both directions.

When the shift between the axes 10 and 11 of the recesses of the polar pieces 4 and 5 varies about a selected value, the indexing couple modulus changes as a result of a manufacturing deviation in respect of the shift of the axes 10 and 11 recesses of the pole pieces 4 and 5.

The reason for this is as follows:

A variation in the shift of the axes 10 and 11 of the recesses of the pole pieces 4 and 5 about the selected value produces a modification in the shape, amplitude and phase in the curve of the reluctance as a function of the angle of the magnetic circuit or of the magnet of the rotor 2, which results in a modification of the indexing couple curve, as a function of the angle from the point of view of the phase A, the amplitude and the shape.

The angle A increases at the same time as the indexing modulus and as the shift of the axes 10 and 11 of the recesses of the pole pieces 4 and 5 decrease.

Thus, a motor designed according to the present invention displays little sensitivity to manufacturing deviations in respect of the shift of the pole pieces, since the torque remains substantially constant within a very wide shift range as appears from FIG. 8.

It should be noted, moreover, that the combination of a shift between the axes 10 and 11 of the recesses of the pole pieces 4 and 5 and of a relatively important recoil, with an air gap which also is relatively important and such that the ratio of the mean air gap to the rotor radius is comprised between 0.7 and 1, results in a very wide manfacturing tolerance.

The various forms of embodiment of the motor according to the invention illustrated in the foregoing may not only be applied in a watch or the like, but also in an alarm and more generally in the timepiece making industry, and in any precision mechanism including step motors.

The present invention is by no means limited to the forms of embodiment described and illustrated which have been given by way of example only. This means that it comprises all technical equivalents to the means described as well as their combinations, if the latter are carried out according to the gist of the invention and fall within the scope of the protection as claimed.

As results from the foregoing, the invention relates to the problem of facilitating of manufacturing and assembling the motor components, that is, the two pole piece parts which are to be assembled to form the stator, the pole pieces recesses of which are conformed to receive the rotor. More particularly, applicant's invention concerns the problem of the mass production of step motors. It is obvious that small manufacturing and assembling or positioning tolerances are contradictory to such a mass production.

The solution proposed by the invention is based upon the discovery that it is possible to considerably increase the air gap width, that is, the ratio of the rotor radius to the stator radius without prejudice to the suitable operation of the motor when the rotor radius is selected to have a minimum value which permits the obtaining of a magnetic flux which is sufficient for ensuring the rotation of the motor. It was discovered contrarily to what was usual hitherto and caused the conditions illustrated by the segment $S_1$ on the FIG. 8 that when maintaining the rotor radius at a minimum value such as in the order of 800 microns, the stator recess radius may be varied in a large range without affecting the proper operation of the motor. This means that the motor torque can be maintained at a substantially constant value in spite of considerable variation of the ratio of the rotor radius to the stator radius. In other words, applicant's invention is based upon the discovery that the value of the ratio of the mean air-gap to the radius of the rotor can vary between 0.7 and 1 and the value of the shift of the two pole pieces is variable between 80 and 220 microns when the rotor radius is maintained at a value on the order of 800 microns. FIG. 8 of the present application shows the motor torque $C_m$ versus the shift D. In the shift value region between 80 and 170 microns, indicated by $S_2$, the motor torque is substantially constant and the motor torque is sufficient for ensuring the proper operation of the motor for shift values between 80 and 200 microns.

It is clear from the foregoing that the invention allows to manufacture motors with ratios of the rotor radius to the stator radius permitting a considerable increase in the possible shift of the pole pieces without affecting the proper functioning of the motor to obtain large manufacturing and assembling tolerances, thereby permitting mass production of the motor.

What is claimed is:

1. A step motor, particularly for an electronic timepiece, comprising
a stator formed by assembly of two pole piece parts the free ends of which are bent towards one another to form two pole pieces, respectively, delimiting therebetween an air-gap;
an exciting coil associated with the stator; and
a rotor consisting of a permanent magnet having a predetermined radius accommodated in said air-gap, the free end of each pole piece having a recess substantially cylindrical in shape such that the axis of each said recess is substantially parallel to the axis of rotation of said rotor, the portions of said pole pieces facing one another having substantially the same shape, said pole pieces being shiftable with respect to one another in a direction perpendicular to the main direction of the magnetic flux generated by said coil without a shift of said pole pieces, wherein for a rotor radius in the order of 800 microns the value of the ratio of the mean air-gap to the radius of said rotor is in the order of between 0.7 and 1 such that the motor operates suitably with values of the shift varying between 80 and 200 microns and the motor torque remains substantially constant in spite of a variation of said shift to permit increased manufacturing and assembling tolerances.

2. A step motor, particularly for an electronic timepiece, comprising:
a stator formed by assembly of two pole piece parts the free ends of which are bent towards one another to form two pole pieces, respectively, delimiting therebetween an air-gap;
an exciting coil associated with the stator; and
a rotor consisting of a permanent magnet having a predetermined radius accommodated in said air-gap, the free end of each pole piece having a recess substantially cylindrical in shape such that the axis of each said recess is substantially parallel to the axis of rotation of said rotor, the portions of said pole pieces facing one another having substantially the same shape, said pole pieces being shiftable with respect to one another in a direction perpendicular to the main direction of the magnetic flux generated by said coil without a shift of said pole pieces, wherein for a rotor with a radius having a minimum value sufficient for the obtaining of a magnetic flux which is sufficient for ensuring the rotation of the rotor, such as a radius value in the order of 800μ, the value of the ratio of the mean air-gap to the radius of said rotor is in the order of between 0.7 and 1 such that the motor operates suitably in a large range of values of the shift such as values varying between 80 and 200 microns and the motor torque remains substantially constant in spite of a variation of said shift to permit increased manufacturing and assembling tolerances.

3. A step motor particularly for an electronic timepiece, comprising:

a stator formed by assembly of two pole piece parts having free ends bent towards one another to form two pole pieces, respectively, delimiting therebetween an air-gap;

an exciting coil associated with the stator; and a rotor consisting of a permanent magnet having a predetermined radius accommodated in said air-gap, the free end of each pole piece having a recess substantially cylindrical in shape such that the axis of each said recess is substantially parallel to the axis of rotation of said rotor, each of said recesses having a radius, said pole pieces being shiftable with respect to one another in a direction perpendicular to the main direction of the magnetic flux generated by said coil without a shift of said pole pieces, the portion of said pole pieces facing one another having substantially the same shape, wherein the value of the rotor radius is sufficient for obtaining a magnetic flux sufficient for ensuring the rotation of the motor and wherein the value of the ratio of the main air-gap to the radius of said rotor is variable between 0.7 and 1 and wherein upon assembly of said motor, the value of the shift of said two pole pieces with respect to the main direction of said magnetic flux is variable between 80 and 200 microns without prejudice to ensuring a correct operation of said motor.

4. A step motor as claimed in claim 3, wherein the axes of said two recesses are in a plane perpendicular to a plane defined by the axis of rotation of said rotor and said main direction of said magnetic flux and are spaceable from one another by a value of between 80 and 400 microns in a direction parallel to said plane defined by said axis of rotation of said rotor and said direction of said magnetic flux.

5. A step motor as claimed in claim 2, wherein said two recesses are spaceable from one another by a value between 150μ and 300μ.

6. A step motor as claimed in claim 3, wherein the axis of rotation of said rotor is positionable at any point of an area perpendicular to said axis of rotation, delimited by a circle with a radius value of 200μ and a center located at the middle of the segment joining together the axes of said two recesses in a plane perpendicular to said axes.

7. The motor of claim 3, wherein said rotor radius has a value on the order of 800 microns.

8. The motor of claim 7, wherein the stator comprises a radius on the order of about 1,500 microns.

* * * * *

UNITED STATES PATENT AND TRADEMARK OFFICE
CERTIFICATE OF CORRECTION

PATENT NO. : 4,665,330

DATED : May 12, 1987

INVENTOR(S) : Jean-Claude Chatelain

It is certified that error appears in the above—identified patent and that said Letters Patent is hereby corrected as shown below: On the title page application data should read -- (63) Continuation-in-part of Serial No. 572,432, January 20, 1984, Patent No. 4,518,884 which is a continuation of Serial No. 255,220, April 17, 1981, abandoned. --

Signed and Sealed this

Thirteenth Day of September, 1988

Attest:

DONALD J. QUIGG

*Attesting Officer*  *Commissioner of Patents and Trademarks*